United States Patent

Habashi et al.

[15] 3,650,679
[45] Mar. 21, 1972

[54] REFINING LOW-GRADE BERYLLIUM ORES BY TREATMENT WITH ANHYDROUS SULFUR TRIOXIDE

[72] Inventors: Fathi Habashi; Raymond Dugdale; Francis L. Holderreed, all of New York, N.Y.

[73] Assignee: The Anaconda Company, New York, N.Y.

[22] Filed: Jan. 12, 1970

[21] Appl. No.: 2,422

[52] U.S. Cl. ................................23/15 R, 75/138, 75/150, 75/153, 176/92, 75/168, 75/116, 23/18, 23/117, 23/24 B, 23/19
[51] Int. Cl. ................................C22b 59/00, C01f 3/00
[58] Field of Search ................23/15, 16, 18, 19, 24.2, 20, 23/21, 117; 75/116

[56] References Cited

UNITED STATES PATENTS 3,148,022    9/1964    Kruse ................................23/15

Primary Examiner—Herbert T. Carter
Attorney—Pennie, Edmonds, Morton, Taylor and Adams

[57] ABSTRACT

Low-grade substantially dry beryllium-containing ores are reacted directly with anhydrous sulfur trioxide, at temperatures ranging from 50° to 350° C., to form beryllium sulfate. The reaction product is then leached with water to dissolve the beryllium sulfate. The resulting solution is separated from the insoluble residue and the beryllium is subsequently recovered from the leach solution.

8 Claims, No Drawings

REFINING LOW-GRADE BERYLLIUM ORES BY TREATMENT WITH ANHYDROUS SULFUR TRIOXIDE

This invention relates to a process for the recovery of beryllium from a beryllium-containing ore and other berylliferous material by reacting the beryllium containing material directly with anhydrous sulfur trioxide.

Although a relatively scarce and expensive material, beryllium has been found to be useful in many varied applications. For example, beryllium is very useful as an alloying agent. When added to copper one obtains a precipitation-hardenable alloy which is extensively used for springs, electrical contacts, bearings and welding electrodes. When alloyed with either aluminum or magnesium, it imparts oxidation resistance and grain refinement to the metals. In the nuclear industry beryllium has been found to be useful as a neutron source, moderator and cladding material for nuclear fuel elements. Beryllium is also used in X-ray tube windows.

In view of the relative scarcity of beryllium and in view of its various industrial applications there has developed the need to obtain beryllium from low-grade beryllium ores, (including other low-grade berylliferous material) as well as from those which are rich in the metal by a process which is less costly and more efficient, than those processes currently used.

The general methods employed in extracting beryllium from its ores involve several rather complex chemical and physical separation treatments. U.S. Pat. No. 3,148,022, for example, discloses a method for the extraction of beryllium values from non-pegmatic ores which comprises contracting the ore in finely divided form with sulfur trioxide gas at a temperature between about 560° C. and about 750° C. and then leaching the reaction product to obtain the desired dissolved beryllium values. Although this method represents an improvement over the previous attempts to refine low-grade beryllium ores it still has several disadvantages. First of all the process requires heating at fairly high temperatures, i.e., 560° to 750° C., preferably 580° to 650° C. Secondly, in failing to provide for the drying of the ore or for the use of a dry reaction atmosphere, the process cannot avoid the formation of sulfuric acid vapors in the gases which leave the reaction zone. The presence of sulfuric acid in these gases results in difficult handling problems.

We have devised an improved process of character described which is performed at relatively low temperatures in an atmosphere substantially free of any water vapor, and thereby we have overcome the shortcomings and inadequacies of the prior art methods while obtaining excellent beryllium recovery.

The present invention contemplates a simple, relatively inexpensive and efficient process for the recovery of beryllium from low-grade beryllium-containing ores, wherein the low-grade ore in a substantially dry condition is reacted directly with anhydrous sulfur trioxide at a temperature below 350° C., preferably in the range from 50° to 350° C., to form water soluble beryllium sulfate. The reacted ore is leached with an aqueous medium to dissolve the beryllium sulfate, and the resulting solution is separated from the insoluble residue. The beryllium is then recovered from the leach solution.

A very significant advantage of the new process is that only a relatively small proportion of aluminum (a common impurity in low-grade berylliferous ore) is solubilized and recovered with the beryllium, thus simplifying subsequent treatment of the leach to obtain high purity beryllium.

Further, we have found that by reacting the substantially dry low-grade beryllium ore directly with anhydrous sulfur trioxide at the indicated low temperatures we have been able to (1) eliminate the necessity for the use of excessive amounts of heat for the reaction and yet still obtain an excellent recovery of soluble beryllium sulfate, (2) avoid the formation of sulfuric acid vapors in the gases leaving the reactor and thus eliminate the difficulty in handling reaction gases which contain sulfuric acid vapors, (3) allow for easy processing of the beryllium sulfate by using a minimum amount of water for leaching the $SO_3$-treated ore, (4) avoid filtration problems during processing of the ore by dehydrating it prior to the low temperature reaction with the sulfur trioxide, and (5) avoid the formation of large amounts of impurities such as aluminum.

An example of the beryllium ore which may be processed by the method of this invention is obtained from the Spor Mountain region in Utah and is classified as having basically four types of BeO containing materials: (1) Montmorillonite containing 1.4 percent BeO; (2) Saponite containing 0.8 percent BeO; (3) calcareous berylliferous ore containing 0.6 percent BeO; and (4) unaltered berylliferous tuff containing 0.5 percent BeO. The first type is high in silica and low in calcite while the last type is low in silica and high in calcite. The other two types have intermediate silica and calcite content. Beryllium in the first and third types occurs mainly as bertrandite ($4BeO \cdot 2SiO_2 \cdot 2.8H_2O$) while in the other two types it occurs as a mixture of bertrandite and saponite. All four types contain appreciable amounts of fluorite. Nodules a few millimeters in diameter and containing a high percentage of beryllium are commonly found in the deposit, but they constitute only a small percentage of the ore.

The beryllium ore preferably is processed according to this invention in a finely divided form. The ore, for example, is prepared for treatment by conventional grinding or crushing operation, screening or by any other method of classification to select the desired particle sizes, and recycle the oversize material. The particle size used for treatment will vary and includes but is by no means limited to sizes in the range from −100 mesh, to −400 mesh. Using the ore in finely divided form allows for rapid and complete reaction with the sulfur trioxide.

The sulfatization process, in which the beryllium in the ore is converted to beryllium sulfate may be performed in a reaction furnace of the fluidized bed type. This type of furnace will allow for very intimate contact between the ore and the sulfur trioxide. However, either a shaft furnace or a rotary kiln furnace may be used for the sulfatization process.

Illustrative of a specific embodiment of the present invention is the following: A low-grade beryllium-containing ore in finely divided form is first placed in a drying furnace where the ore is heated to a temperature of about 200° C. until the water of hydration (if any) is eliminated and the ore is substantially completely dried. The time required for this operation is about 60 minutes. The substantially dried ore is then placed in a reaction furnace. Anhydrous sulfur trioxide gas is introduced into the furnace and allowed to react with the ore for approximately 15 minutes at a temperature which typically is about 200° C.

The reaction product from the furnace is leached with water to dissolve the beryllium sulfate and then is subjected to a filtration procedure or other solid-liquid separation operation where the insoluble residue is separated from the beryllium sulfate solution. The beryllium sulfate solution is then further processed for beryllium recovery by any of the available well-known methods, e.g., alkaline precipitation or solvent extraction.

The invention is described in detail with reference to the following examples, for illustrative purposes.

EXAMPLE I

The ore sample used analyzed as follows: BeO—0.87 percent, $Al_2O_3$—10.56 percent, $CaF_2$—6.6 percent, F—3.2 percent, MgO—3.0 percent, $CO_2$—3.0 percent and $H_2O$—6.5 percent (all percentages by weight). This analysis conforms with that of a saponite type of ore. A mineralogical analysis of a typical saponite ore from the Spor Mountain appears in Table 1.

Table 1 - Mineralogical Analysis of Saponite Ore

|  | % (by weight) |
|---|---|
| Montmorillonite | 25 |
| Berylliferous Saponite | 10 |
| Hydrated Bertrandite | 2 |
| Volcanic Glass | 10 |

| | |
|---|---|
| Calcite | 5 |
| Fluorite | 6 |
| Iron - Manganese Oxides | 3 |
| Cristobalite, Tridymite, Quartz | 25 |
| Feldspars | 15 |

The ore was heated in a furnace which was initially flushed with purified nitrogen to remove atmospheric moisture, oxygen, carbon dioxide, etc. The sulfur trioxide used for the reaction was commercially pure, colorless liquid sulfur trioxide in the stabilized gamma form. Among the reagents used to stabilize the sulfur trioxide are boron compounds, $SbCl_5$ and $SbF_5$: these generally are used to the extent of 0.5 percent.

The analysis for beryllium and aluminum was performed by the atomic absorption technique. The water solubility of the reaction product was determined hot. By analyzing the insoluble residue it was possible to calculate the percentage of dissolution. The same procedure was used to estimate aluminum recovery in the leach solution.

Two parts by weight of finely ground ore which was first dried at 200° C. for a period of 60 minutes was placed as a thin bed in a reaction furnace and allowed to react with gaseous anhydrous sulfur trioxide for 15 minutes at 200° C. The reacted ore was then transferred to a leaching vessel and leached with hot water. Analysis showed that 84.3 percent of the beryllium content of the ore feed was recovered as water soluble beryllium in the leach solution. Extraction of the water-leach residue by 0.5 g./l. $H_2SO_4$(pH=2) showed that all the recoverable beryllium was water soluble. The water soluble aluminum recovered in the leach solution amounted to 20.6 percent of that present in the ore feed.

EXAMPLE II

Following the same procedure as in Example I, the finely ground dried ore was reacted with the sulfur trioxide for 15 minutes at 250° C. The water soluble beryllium recovery was 81.5 percent whereas the water soluble aluminum was 27.6 percent.

EXAMPLE III

Following the same procedure as in Example I, the finely ground dried ore was reacted with the sulfur trioxide for 15 minutes at 300° C. The water soluble beryllium recovery was 83.1 percent. The water soluble aluminum remained low, but was greater than in Example II.

We claim:

1. Process for the recovery of beryllium from a substantially dry beryllium-containing ore which comprises reacting said ore directly with anhydrous sulfur trioxide at a temperature below 350° C. to form beryllium sulfate, leaching the reacted ore with an aqueous medium to dissolve the beryllium sulfate, separating the resulting solution from the insoluble residue, and recovering beryllium from the leach solution.

2. The process according to claim 1 in which the ore is heated at a temperature of about 200° C. prior to the reaction with sulfur trioxide.

3. The process according to claim 1 in which the sulfur trioxide is in gaseous form.

4. The process according to claim 1 in which the ore is reacted with sulfur trioxide at a temperature in the range from about 50° C. to about 350° C.

5. The process according to claim 1 in which the ore is reacted with sulfur trioxide at a temperature of about 200° C.

6. The process according to claim 1 in which the ore is ground to finely divided form prior to the reaction with sulfur trioxide.

7. The process according to claim 1 in which the ore in comminuted form is reacted with sulfur trioxide in a fluidized bed reactor.

8. The process according to claim 1 in which the ore is selected from the group consisting of montmorillonite, saponite, calcareous berylliferous ore, unaltered berylliferous tuff, and mixtures thereof.

* * * * *